US012214665B2

(12) United States Patent
Valenzuela et al.

(10) Patent No.: US 12,214,665 B2
(45) Date of Patent: Feb. 4, 2025

(54) VIBRATION DAMPENING ENGINE MOUNT AND MODULAR VIBRATION DAMPENING ENGINE MOUNT SYSTEM

(71) Applicant: Nissan North America, Inc., Franklin, TN (US)

(72) Inventors: Jennifer Valenzuela, Aguascalientes (MX); Marco Antonio Flores Valdez, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 374 days.

(21) Appl. No.: 17/538,598

(22) Filed: Nov. 30, 2021

(65) Prior Publication Data
US 2023/0166590 A1   Jun. 1, 2023

(51) Int. Cl.
*B60K 5/12* (2006.01)
*F16F 7/108* (2006.01)

(52) U.S. Cl.
CPC .......... *B60K 5/1216* (2013.01); *B60K 5/1241* (2013.01); *F16F 7/108* (2013.01); *F16F 2230/32* (2013.01)

(58) Field of Classification Search
CPC .. B60K 5/1208; B60K 5/1216; B60K 5/1241; F16F 1/40; F16F 7/108; F16F 2230/32; F16F 7/10
USPC ........................................................ 248/559
See application file for complete search history.

(56) References Cited

U.S. PATENT DOCUMENTS

| | | | | |
|---|---|---|---|---|
| 2,713,485 | A * | 7/1955 | Tillou ................... | F16F 1/403 267/141.1 |
| 3,311,331 | A * | 3/1967 | Steimen ................. | F16F 1/376 248/633 |
| 3,730,509 | A * | 5/1973 | Jorn ........................ | F16F 3/12 267/152 |
| 4,026,534 | A * | 5/1977 | Barnwell ............... | B60R 19/26 267/152 |
| 4,433,834 | A * | 2/1984 | Jwuc ..................... | B60G 11/22 267/141.1 |
| 4,610,420 | A * | 9/1986 | Fukushima ........... | F16F 13/262 180/300 |
| 4,779,834 | A * | 10/1988 | Bittner ................. | B60K 5/1241 74/579 E |
| 4,817,909 | A * | 4/1989 | Deane ................... | B60K 5/1241 267/152 |
| 6,113,058 | A * | 9/2000 | Iwasaki .................. | F16C 7/02 248/678 |

(Continued)

FOREIGN PATENT DOCUMENTS

IN   201711030897   3/2019
JP   H10267084 A  * 10/1998 ............ F16F 1/387

(Continued)

*Primary Examiner* — Taylor Morris
(74) *Attorney, Agent, or Firm* — Young Basile Hanlon & MacFarlane, P.C.

(57) ABSTRACT

A vibration dampening engine mount configured to mount an engine to a vehicle frame includes: a first bolt receiver having a first through hole configured to receive a first bolt; a second bolt receiver having a second through hole configured to receive a second bolt; and a mass damper connector integrally connecting the first bolt receiver and the second bolt receiver, wherein the vibration dampening engine mount has a predetermined mass.

16 Claims, 6 Drawing Sheets

(56) References Cited

U.S. PATENT DOCUMENTS

| | | | | |
|---|---|---|---|---|
| 6,129,177 A * | 10/2000 | Gwinn | ............... | F16F 7/108 |
| | | | | 181/207 |
| 7,263,806 B2 * | 9/2007 | Pellegrino | ............ | F16F 1/40 |
| | | | | 248/564 |
| 9,630,484 B1 * | 4/2017 | Valdez | ............ | B60K 5/1208 |
| 9,689,457 B2 * | 6/2017 | Kojima | ............ | F16F 15/022 |
| 10,046,634 B2 * | 8/2018 | Takahashi | ............ | B60K 5/1208 |
| 10,518,623 B2 * | 12/2019 | Takahashi | ............ | F16F 7/108 |
| 10,933,727 B2 | 3/2021 | Kim et al. | | |
| 2008/0093186 A1 * | 4/2008 | Imai | ............ | F02B 77/13 |
| | | | | 188/379 |
| 2022/0128119 A1 * | 4/2022 | Seo | ............ | F16F 1/3842 |

FOREIGN PATENT DOCUMENTS

| | | | | |
|---|---|---|---|---|
| KR | 101846784 B1 | 4/2018 | | |
| WO | WO-0242660 A1 * | 5/2002 | ............ | F16C 7/02 |
| WO | WO-2020239279 A1 * | 12/2020 | ............ | F16F 15/1435 |

* cited by examiner

US 12,214,665 B2

VIBRATION DAMPENING ENGINE MOUNT AND MODULAR VIBRATION DAMPENING ENGINE MOUNT SYSTEM

TECHNICAL FIELD

This disclosure relates to an integrated engine mount that is configured to dampen engine vibrations and a modular system of vibration dampening engine mounts configured to dampen engine vibrations.

BACKGROUND

An engine is mounted to a vehicle frame at multiple locations using engine, or motor, mounts. Engine mounts function to keep excess movement and vibrations to a minimum. Engine mount designs will vary depending on the vehicle model, engine model and mounting location. To further function as a vibration dampener, engine mounts must be designed to counter the vibrations created when the engine is running, the vibrations changing as the engine idles, accelerates and decelerates. Some engine mounts can be difficult and costly to manufacture due to the criteria necessary to perform its functions.

SUMMARY

Disclosed herein are implementations of vibration dampening engine mounts.

One implementation of a vibration dampening engine mount configured to mount an engine to a vehicle frame includes: a first bolt receiver having a first through hole configured to receive a first bolt; a second bolt receiver having a second through hole configured to receive a second bolt; and a mass damper connector integrally connecting the first bolt receiver and the second bolt receiver, wherein the vibration dampening engine mount has a predetermined mass.

The first bolt receiver and the second bolt receiver are typically of the same size and weight. The mass damper connector can have varying shapes as necessary to accommodate structures between and/or near the bolt locations. The mass damper connector can have a mass that, in combination with the mass of the first and second bolt receivers, is sufficient to dampen the engine vibrations.

Also disclosed herein are implementations of a modular vibration dampening engine mount system. The modular system comprises multiple vibration dampening engine mounts of the same or varying mass and shape that, when used together at a mounting point, provide the necessary mass to dampen the engine vibrations and accommodate any structures between and/or near the mounting bolts.

One implementation of a modular vibration dampening engine mount system comprises a first vibration dampening engine mount comprising: a first pair of bolt receivers, each of the first pair of bolt receivers having a through hole configured to receive a respective bolt; and a first mass damper connector integrally connecting the first pair of bolt receivers, wherein the first vibration dampening engine mount has a first predetermined mass. A second vibration dampening engine mount comprises: a second pair of bolt receivers, each of the second pair of bolt receivers having a through hole configured to receive the respective bolt; and a second mass damper connector integrally connecting the second pair of bolt receivers. The second vibration dampening engine mount has a second predetermined mass different from the first predetermined mass.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Engine mounts function to position and fix the engine to the vehicle's frame, minimizing movement of the engine. Minimizing movement in turn minimizes (i.e., dampens) or eliminates noises due to vibration, such as "kata/kata" noise. Engine mount designs will vary depending on the vehicle model, engine model and mounting location. To further function as a vibration dampener, engine mounts must be designed to counter the vibrations created when the engine is running, the vibrations changing as the engine idles, accelerates and decelerates. Conventionally, each engine mount is configured for a single bolt, and is fabricated with a specific profile configured to fit in a particular engine mount location, as well as a specific mass that has proven during testing to dampen vibrations of the particular vehicle at that particular location. With an engine mount for each bolt, the number of parts required increases. Fabrication costs increase due to the specificity of the application.

Figure 1:
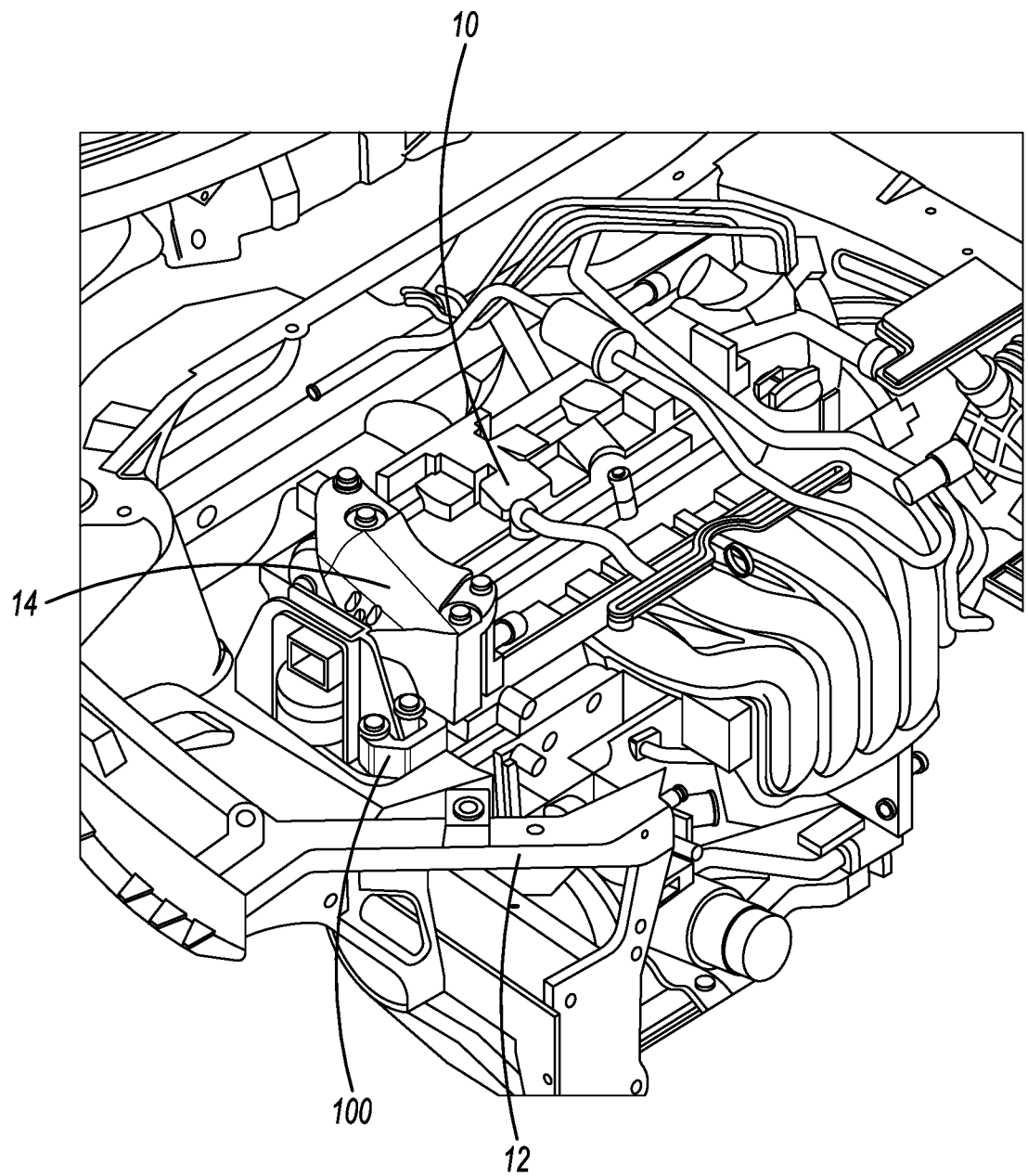
FIG. 1 is a schematic illustrating beneath the hood of a vehicle, showing an engine, a frame and an implementation of a vibration dampening engine mount as disclosed herein.
Figure 2:
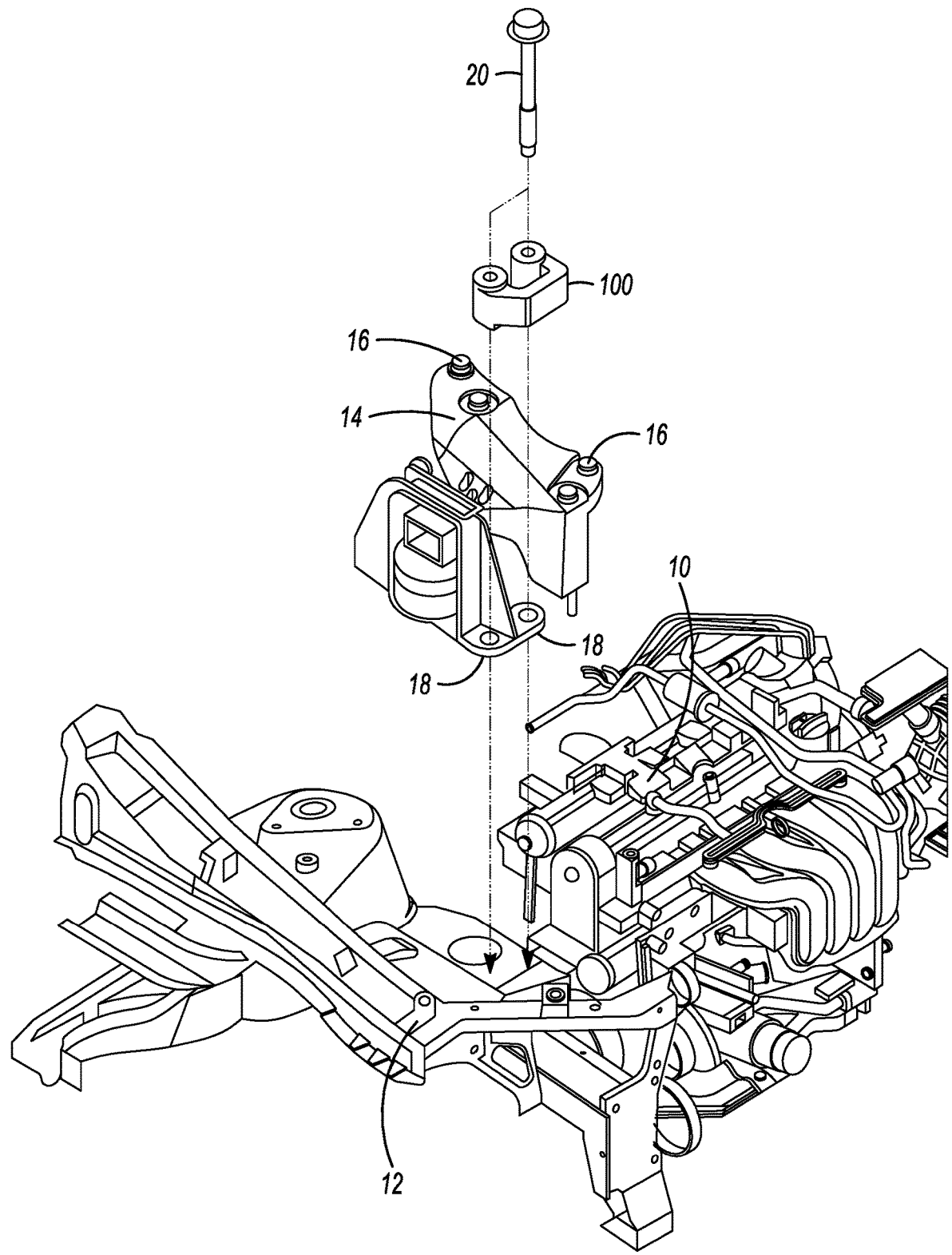
FIG. 2 is an exploded view of the engine, frame and the implementation of the vibration dampening engine mount.

Disclosed herein are implementations of vibration dampening engine mounts configured to receive two bolts, reducing the number of parts. FIG. 1 is a schematic illustrating beneath the hood of a vehicle, showing an engine 10, a frame 12, an intermediate mounting member 14 and an implementation of a vibration dampening engine mount 100 as disclosed herein. FIG. 2 is an exploded view illustrating how the intermediate mounting member 14 has multiple attachment points 16 to the engine 10 as well as attachment points 18 to the frame 12. The vibration dampening engine mount 100 attaches the engine 10 to the frame 12 via the intermediate mounting member 14 using bolts 20.

Figure 3:
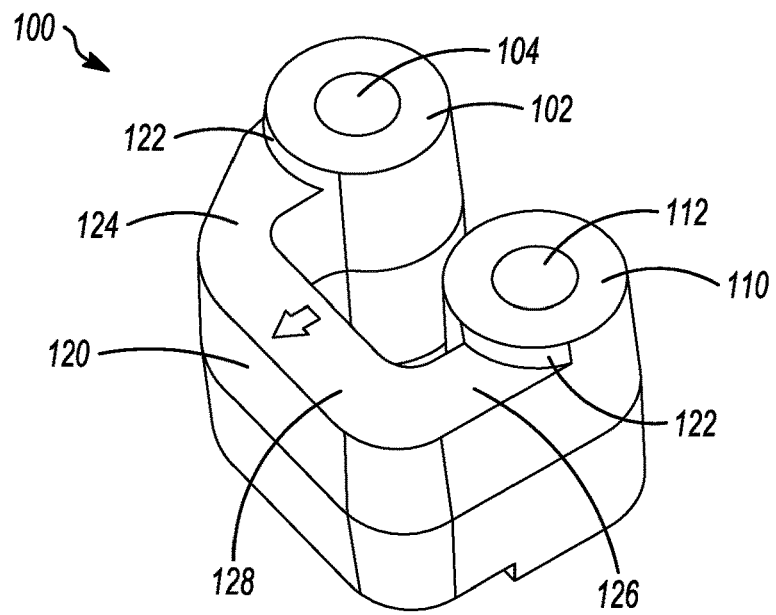
FIG. 3 is a perspective view of an implementation of the vibration dampening engine mount as disclosed herein.
Figure 4:
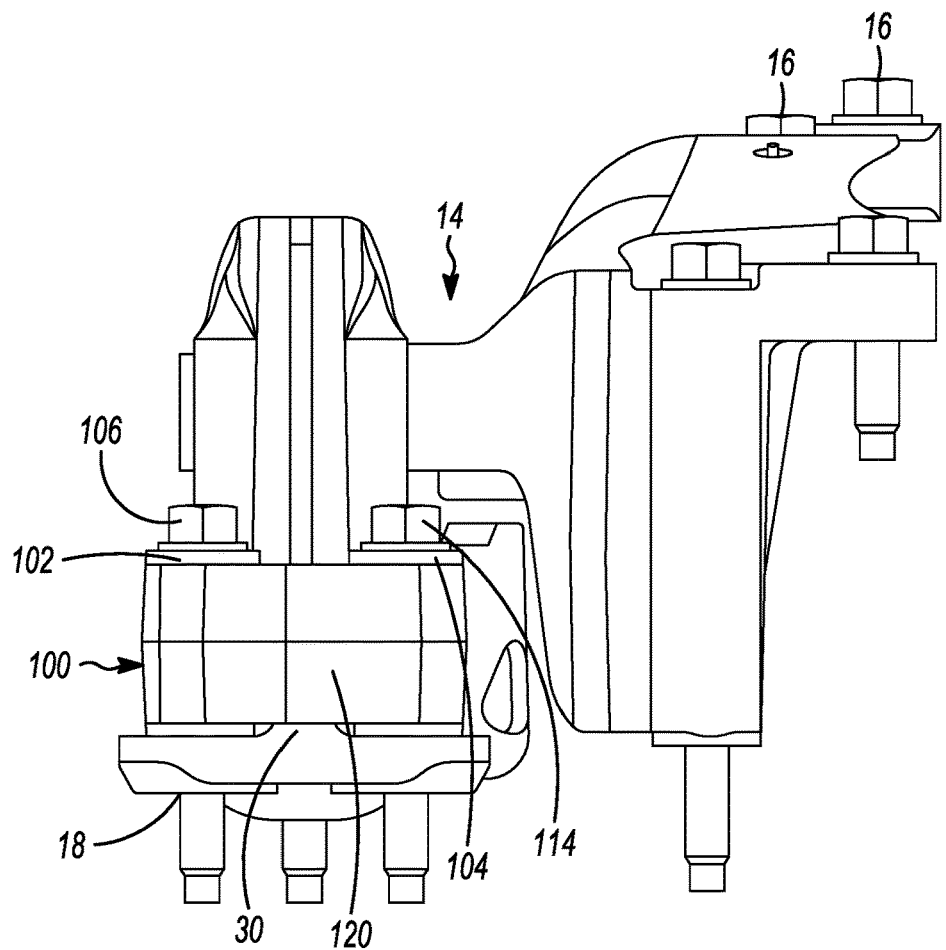
FIG. 4 is a front elevation view of the vibration dampening engine mount illustrating the vibration dampening engine mount attached to the engine with bolts.

One implementation of a vibration dampening engine mount 100 configured to mount the engine 10 to the vehicle frame 12 is shown in FIG. 3. The vibration dampening engine mount 100 has a first bolt receiver 102 having a first through hole 104 configured to receive a first bolt 106 (shown in FIG. 4) and a second bolt receiver 110 having a second through hole 112 configured to receive a second bolt 114 (shown in FIG. 4). A mass damper connector 120 integrally connects the first bolt receiver 102 and the second bolt receiver 110. As used herein, the term "integrally connects" indicates that the connected pieces are a unitary structure. The vibration dampening engine mount 100 has a predetermined mass, predetermined through testing during manufacture to ensure effective vibration dampening for the specific mounting location. As a non-limiting example, the implementation of the vibration dampening engine mount 100 used in FIGS. 1, 2, 4 and 5 is approximately 600 grams.

Figure 5:
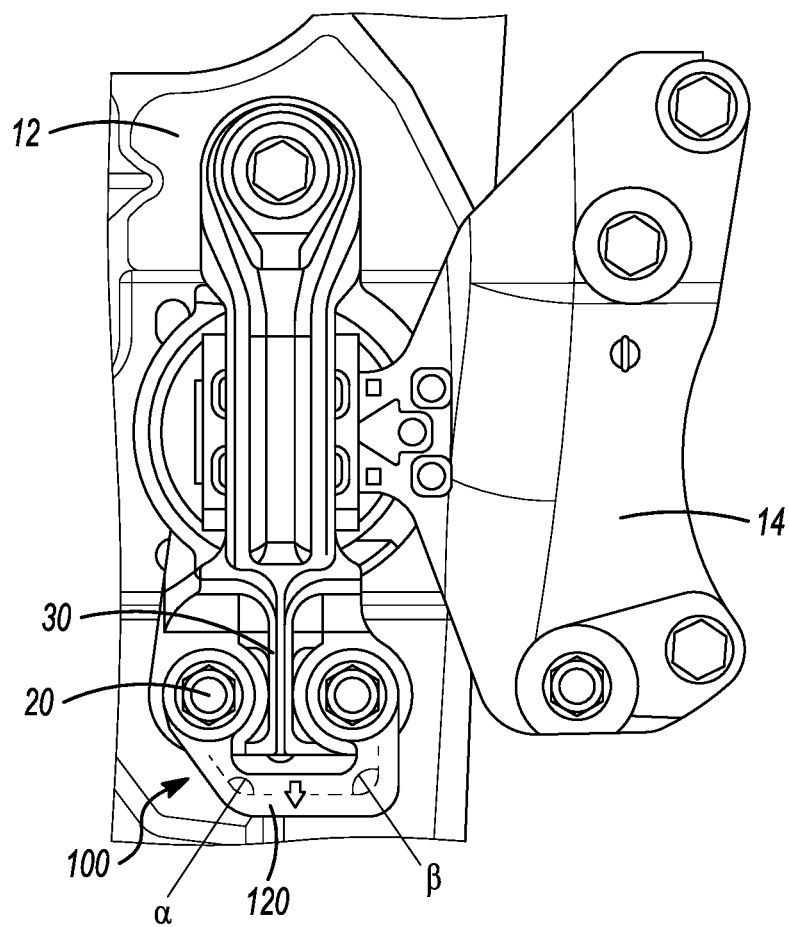
FIG. 5 is a plan view of FIG. 4 with the frame included.

The implementations of the vibration dampening engine mounts disclosed herein can have mass damper connectors of different configurations depending on the specific mounting location as the location may have structures or be near other components that form obstacles near or between the attachment points 18. The vibration dampening engine mount 100 in FIG. 3 is a non-limiting example wherein the mass damper connector 120 has a particular shape. The vibration dampening engine mount 100 of FIG. 3 is shown installed on the intermediate mounting member 14 in FIG. 4 looking in a direction from the front of the vehicle to the rear of the vehicle. FIG. 5 is a plan view of FIG. 4 and also includes the frame 12.

In the implementation in FIG. 3, the mass damper connector 120 extends from a forward-facing surface 122 of each of the first bolt receiver 102 and the second bolt receiver 110. More particularly, the mass damper connector 120 may have one end that is a first leg 124 extending from the forward-facing surface 122 of the first bolt receiver 102, its other end being a second leg 126 extending from the forward-facing surface 122 of the second bolt receiver 110, and a bridge portion 128 extending between the first leg 124 and the second leg 126. Such a configuration allows for means to connect the first and second bolt receivers 102, 110 and provide the necessary mass even when there is an obstruction 30 (shown in FIG. 5) between the attachment points 18. The first leg 124 can extend from the forward-facing surface 122 of the first bolt receiver 102 and toward the second leg 126 at an obtuse angle α best illustrated in FIG. 5. This configuration provides clearance for another component, such as an air conditioning line. The second leg 126 and the bridge portion 128 meet at a ninety-degree angle β, also best shown in FIG. 5.

Figure 6A:
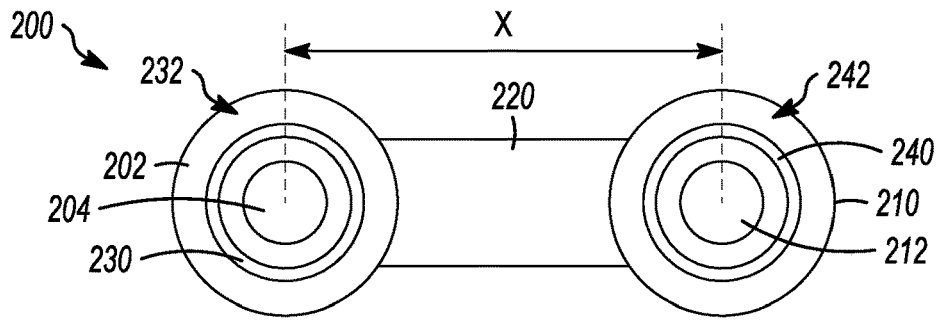
FIG. 6A is a plan view of another implementation of a vibration dampening engine mount and FIG. 6B is a side elevation view of the vibration dampening engine mount of FIG. 7A.
Figure 6B:
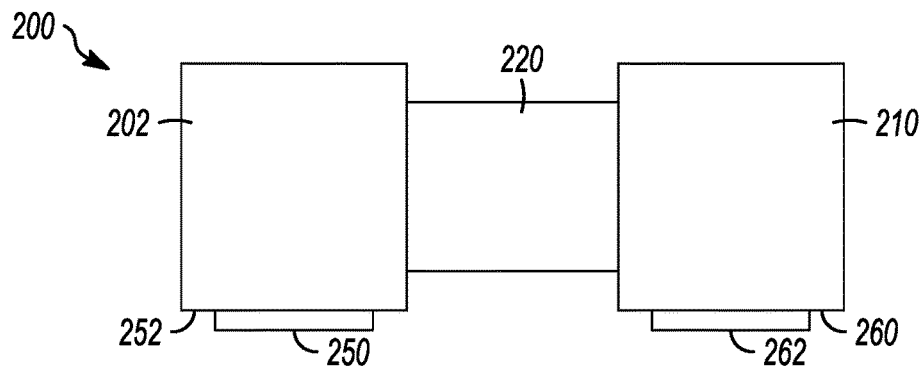

If there are no structures between the attachment points 18, a vibration dampening engine mount 200 may be implemented as illustrated in FIGS. 6A and 6B. Like the vibration dampening engine mount 100 in FIG. 3, the vibration dampening engine mount 200 has a first bolt receiver 202 having a first through hole 204 configured to receive a first bolt (not shown) and a second bolt receiver 210 having a second through hole 212 configured to receive a second bolt (not shown). A mass damper connector 220 integrally connects the first bolt receiver 202 and the second bolt receiver 210. In this implementation, the mass damper connector 220 spans a shortest distance between the first bolt receiver 202 and the second bolt receiver 210.

The mass of the vibration dampening engine mounts 100, 200 can be changed by changing a wall thickness of the first bolt receiver 102, 202 and the second bolt receiver 102, 202 and/or by changing a height and/or thickness of the mass damper connector 120, 220. As a non-limiting example, a vibration dampening engine mount 300 shown in FIGS. 7A and 7B has a first bolt receiver 302 and a second bolt receiver 310 with thinner walls than those in FIGS. 6A and 6B while the mass damper connector 320 is the same size as that in FIGS. 6A and 6B. These are non-limiting examples and other implementations are contemplated.

Also disclosed herein is a modular vibration dampening engine mount system having two or more of the vibration dampening engine mounts 100, 200, 300 used in combination. The modular system allows for easily made and readily accessible vibration dampening engine mounts to be used to vary the mass at the attachment points until the necessary total mass is achieved, i.e., the predetermined mass. The solution is more "off the shelf" than conventionally known, providing many benefits over the costly, difficult to manufacture engine mounts.

Figure 8:
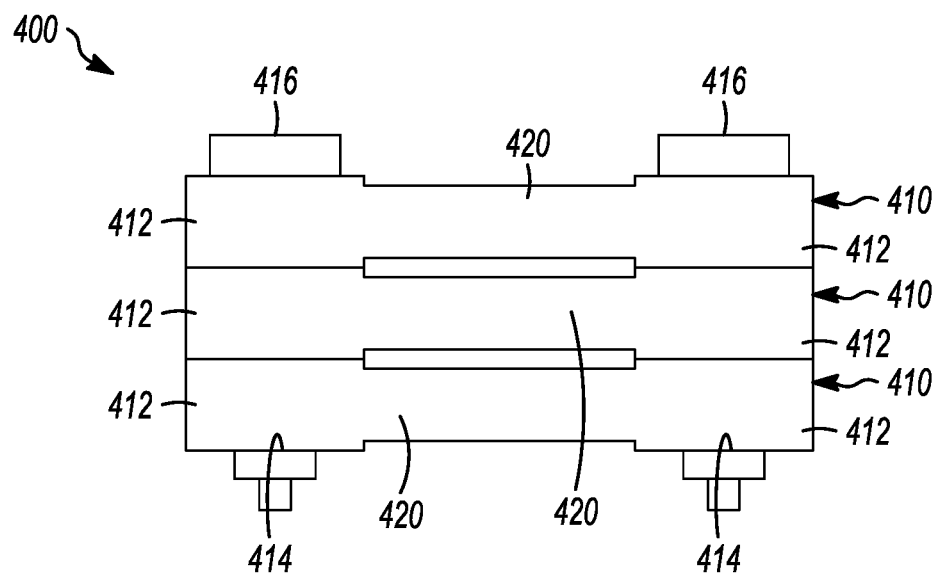
FIG. 8 is a side elevation view of an implementation of a modular vibration dampening engine mount system shown with bolts as disclosed herein.

FIG. 8 illustrates a modular vibration dampening engine mount system 400 using two or more of the same vibration dampening engine mounts to achieve the requisite vibration dampening. Three are shown in FIG. 8 by means of example only. The modular vibration dampening engine mount system 400 comprises two or more vibration dampening engine mounts 410. The vibration dampening engine mounts 410 can be any of the implementations 100, 200, 300 disclosed herein. Each vibration dampening engine mount 410 has a pair of bolt receivers 412, each of the pair of bolt receivers 412 having a through hole 414 configured to receive a respective bolt 420. A mass damper connector 420 is integrally connecting the pair of bolt receivers 412. In this implementation, each vibration dampening engine mount has the same predetermined mass.

Figure 9:
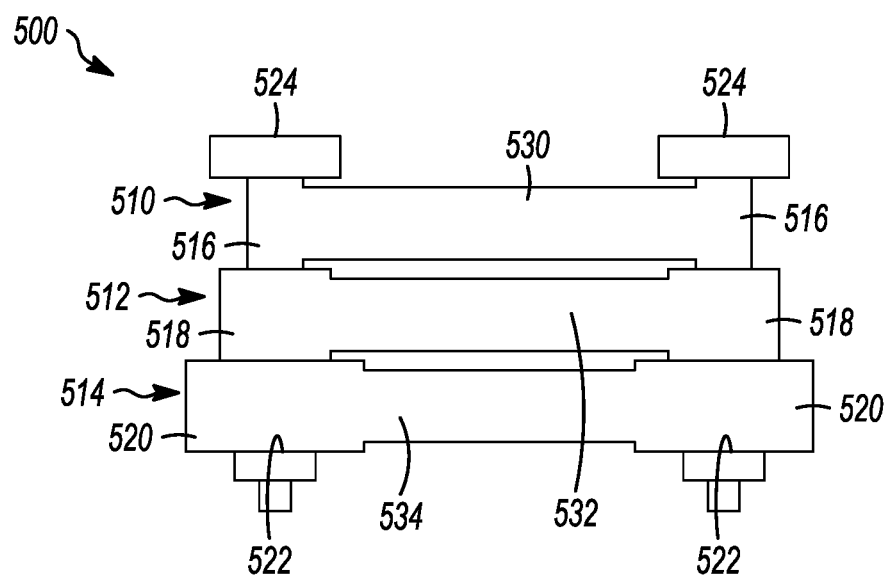
FIG. 9 is a side elevation view of another implementation of a modular vibration dampening engine mount system shown with bolts as disclosed herein.

FIG. 9 illustrates a modular vibration dampening engine mount system 500 using two or more vibration dampening engine mounts, at least two of the vibration dampening engine mounts being different in shape and/or mass to achieve the requisite vibration dampening. Three different vibration dampening engine mounts 510, 512, 514 are shown in FIG. 9 by means of example only in this implementation of the modular vibration dampening engine mount system 500. The vibration dampening engine mounts 510, 512, 514 can be any combination of the implementations 100, 200, 300 disclosed herein. Each vibration dampening engine mount 510, 512, 514 has a pair of bolt receivers 516, 518, 520, respectively, with each of the pair of bolt receivers 516, 518, 520 having a through hole 522 configured to receive a respective bolt 524. A mass damper connector 530, 532, 534 is integrally connecting the respective pair of bolt receivers 516, 518, 520. In this implementation, each vibration dampening engine mount has a different predetermined mass. For example, vibration dampening engine mount 510 has less mass that vibration dampening engine mount 512, which in turn has less mass than vibration dampening engine mount 514. Any combination of the same or different vibration dampening engine mounts is contemplated. In each of the implementations herein, the vibration dampening engine mounts have the same distance X, shown in FIG. 6A, between the central axis of the through holes. This distance X can be, as a non-limiting example, 400 mm.

Figure 7A:
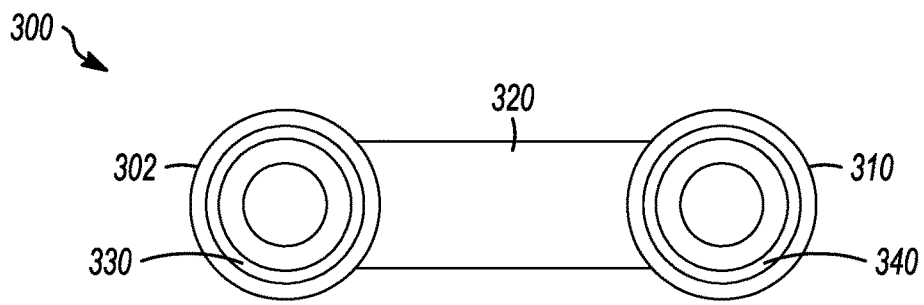
FIG. 7A is a plan view of another implementation of a vibration dampening engine mount and FIG. 7B is a side elevation view of the vibration dampening engine mount of FIG. 8A.

Any implementation of the vibration dampening engine mounts disclosed herein can include one or more alignment members. The alignment members assist in obtaining a close stacking structure when used in the modular vibration dampening engine mount systems disclosed herein. As illustrated in FIG. 6A, a first alignment member 230 is formed on a top surface 232 of the first bolt receiver 202, and another first alignment member 240 formed on a top surface 242 of the second bolt receiver 210. As a non-limiting example, the first alignment members 230, 240 can be grooves formed in the respective top surfaces 232, 242. The groove can be sized to receive the bottom of the bolt receivers of an adjacent vibration dampening engine mount. FIG. 7A is similarly illustrated with optional first alignment members 330, 340. Although not shown, vibration dampening engine mount 100 in FIG. 3 can also include first alignment members.

Figure 7B:
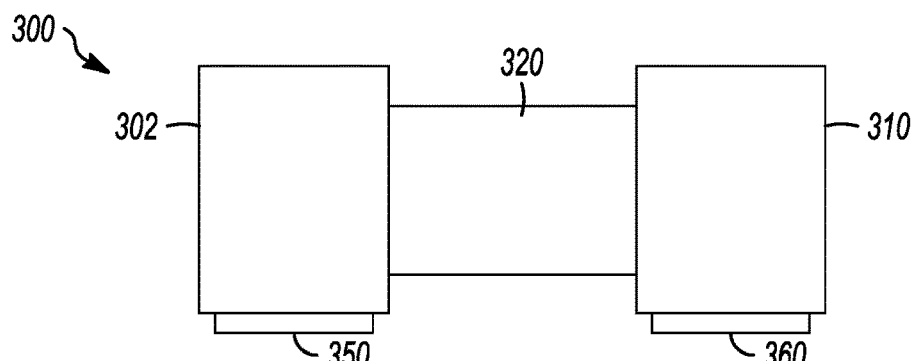

As illustrated in FIG. 6B, a second alignment member 250 can be formed on a bottom surface 252 of the first bolt receiver 202, and another second alignment member 260 can be formed on a bottom surface 262 of the second bolt receiver 210. As a non-limiting example, the second alignment members 250, 260 can be tongues extending from the respective bottom surfaces 252, 262 and configured to sit in grooves of an adjacent vibration dampening engine mount. FIG. 7B is similarly illustrated with optional second alignment members 350, 360. Although not shown, vibration dampening engine mount 100 in FIG. 3 can also include second alignment members.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vibration dampening engine mount configured to mount an engine to a vehicle frame, the vibration dampening engine mount comprising:
    a first bolt receiver having a first through hole configured to receive a first bolt;
    a second bolt receiver having a second through hole configured to receive a second bolt; and
    a mass damper connector integrally connecting the first bolt receiver and the second bolt receiver,
    wherein the mass damper connector extends from the first bolt receiver at one end at a first angle measured from a straight line between the first bolt receiver and the second bolt receiver, and extends from the second bolt receiver at an opposite end at a second angle measured from the straight line, the one end and the opposite end connected by a bridge portion; and
    wherein the vibration dampening engine mount has a predetermined mass.

2. The vibration dampening engine mount of claim 1, wherein the one end extends from the first bolt receiver and toward the other end at an obtuse angle.

3. The vibration dampening engine mount of claim 2, wherein the other end and the bridge portion meet at a ninety-degree angle.

4. The vibration dampening engine mount of claim 1, further comprising:
    a first alignment member formed on a top surface of the first bolt receiver, the top surface being a surface through which the through hole is formed; and
    another first alignment member formed on a top surface of the second bolt receiver.

5. The vibration dampening engine mount of claim 1, further comprising:
    a second alignment member formed on a bottom surface of the first bolt receiver; and
    another second alignment member formed on a bottom surface of the second bolt receiver.

6. A modular vibration dampening engine mount system, comprising:
    a first vibration dampening engine mount, comprising:
        a first pair of bolt receivers, each of the first pair of bolt receivers having a through hole configured to receive a respective bolt; and
        a first mass damper connector integrally connecting the first pair of bolt receivers, wherein the first mass damper connector is substantially U-shaped such that the first mass damper connector does not extend along a direct line connecting the first pair of bolt receivers, and wherein the first vibration dampening engine mount has a first predetermined mass;
    a second vibration dampening engine mount, comprising:
        a second pair of bolt receivers, each of the second pair of bolt receivers having a through hole configured to receive the respective bolt; and
        a second mass damper connector integrally connecting the second pair of bolt receivers, wherein the second vibration dampening engine mount has a second predetermined mass.

7. The modular vibration dampening engine mount system of claim 6, wherein the first predetermined mass is different from the second predetermined mass.

8. The modular vibration dampening engine mount system of claim 6, wherein the first predetermined mass is the same as the second predetermined mass.

9. The modular vibration dampening engine mount system of claim 6, wherein the second mass damper connector is a substantially U-shaped connector such that the second mass damper connector does not extend along a direct line connecting the second pair of bolt receivers.

10. The modular vibration dampening engine mount system of claim 9, wherein the at least one of the first mass damper connector and the second mass damper connector has one leg extending from one of the respective pair of bolt receivers at an obtuse angle and toward a leg extending from another of the respective pair of bolt receivers.

11. The modular vibration dampening engine mount system of claim 6, wherein one of the first pair of bolt receivers and the second pair of bolt receivers further comprises:
    a first alignment member formed on a top surface of the one of the first pair of bolt receivers and the second pair of bolt receivers.

12. The modular vibration dampening engine mount system of claim 11, wherein the first alignment member is sized to receive a bottom surface of another of the first pair of bolt receivers and the second pair of bolt receivers.

13. The modular vibration dampening engine mount system of claim 11, wherein another of the first pair of bolt receivers and the second pair of bolt receivers comprises:
    a second alignment member formed on a bottom surface of the other of the first pair of bolt receivers and the second pair of bolt receivers, the second alignment member configured to sit in the first alignment member formed on the top surface of the one of the first pair of bolt receivers and the second pair of bolt receivers.

14. The modular vibration dampening engine mount system of claim 6, further comprising:
    a third vibration dampening engine mount having a third predetermined mass different from the first predetermined mass and the second predetermined mass.

15. The modular vibration dampening engine mount system of claim 6, wherein the first pair of bolt receivers has a first wall thickness and the second pair of bolt receivers has a second wall thickness, the first wall thickness and the second wall thickness being equal.

16. The modular vibration dampening engine mount system of claim 6, wherein the first pair of bolt receivers has a first wall thickness and the second pair of bolt receivers has a second wall thickness, the first wall thickness being different from the second wall thickness.

* * * * *